No. 715,724. Patented Dec. 9, 1902.
J. F. WOODSON & O. L. LINDSEY.
CASH REGISTER.
(Application filed June 17, 1902.)
(No Model.) 5 Sheets—Sheet 4.
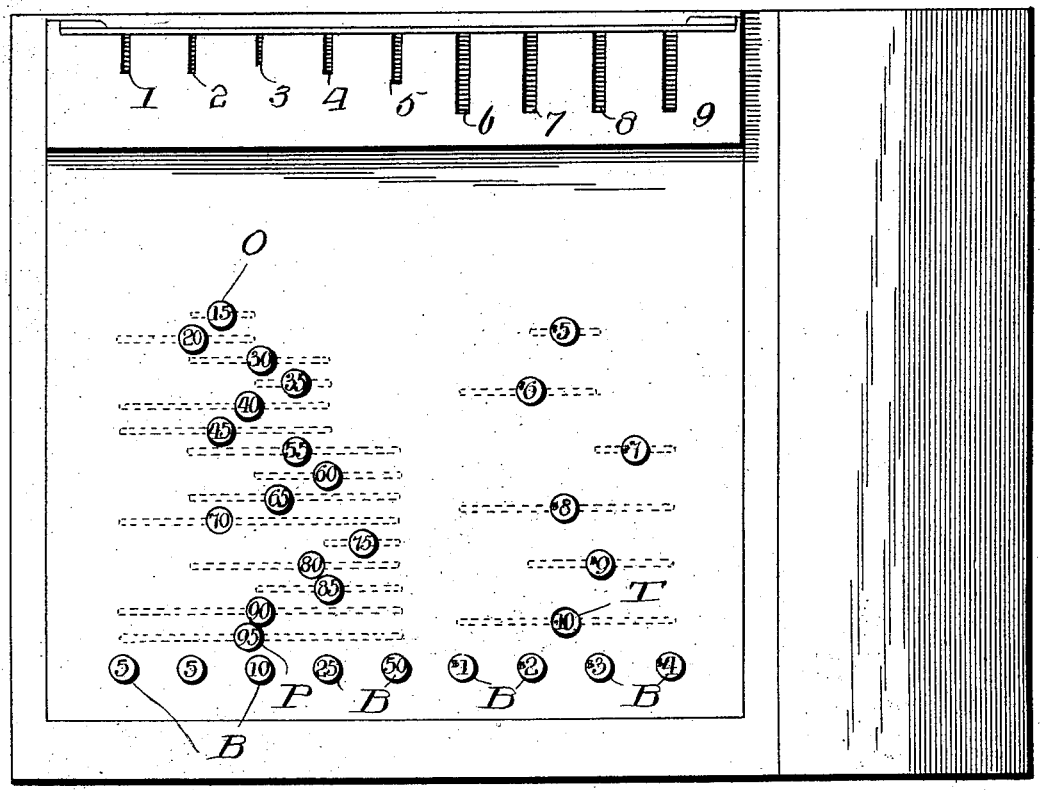
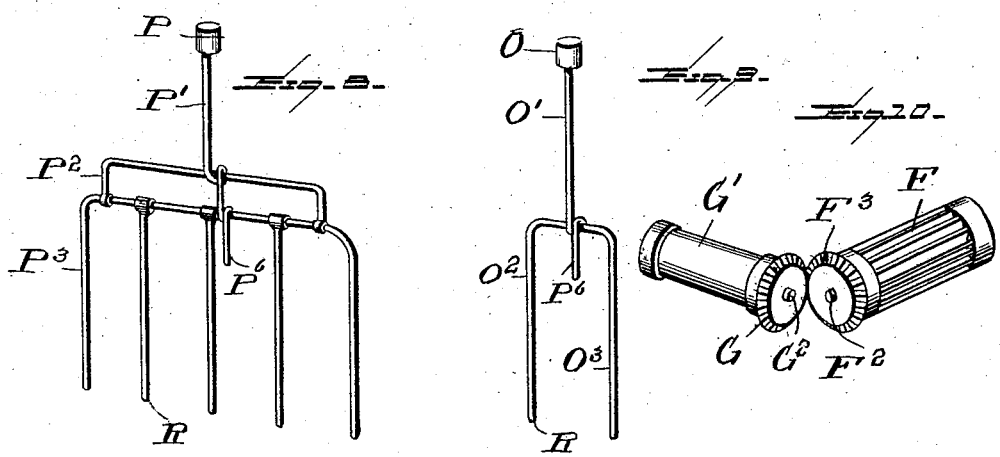
WITNESSES:
INVENTORS
J. F. Woodson and O. L. Lindsey
BY Franklin H. Hough
Attorney

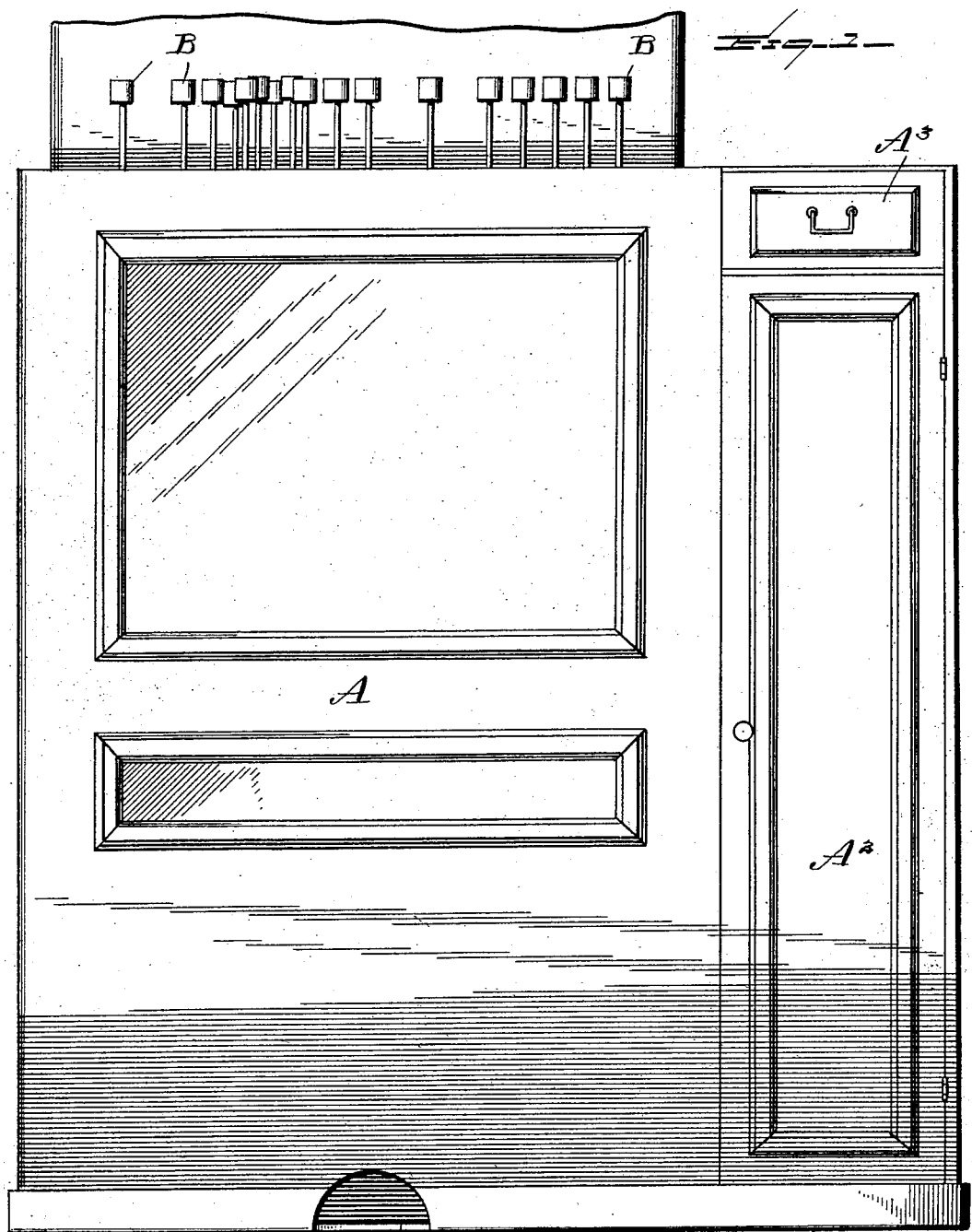

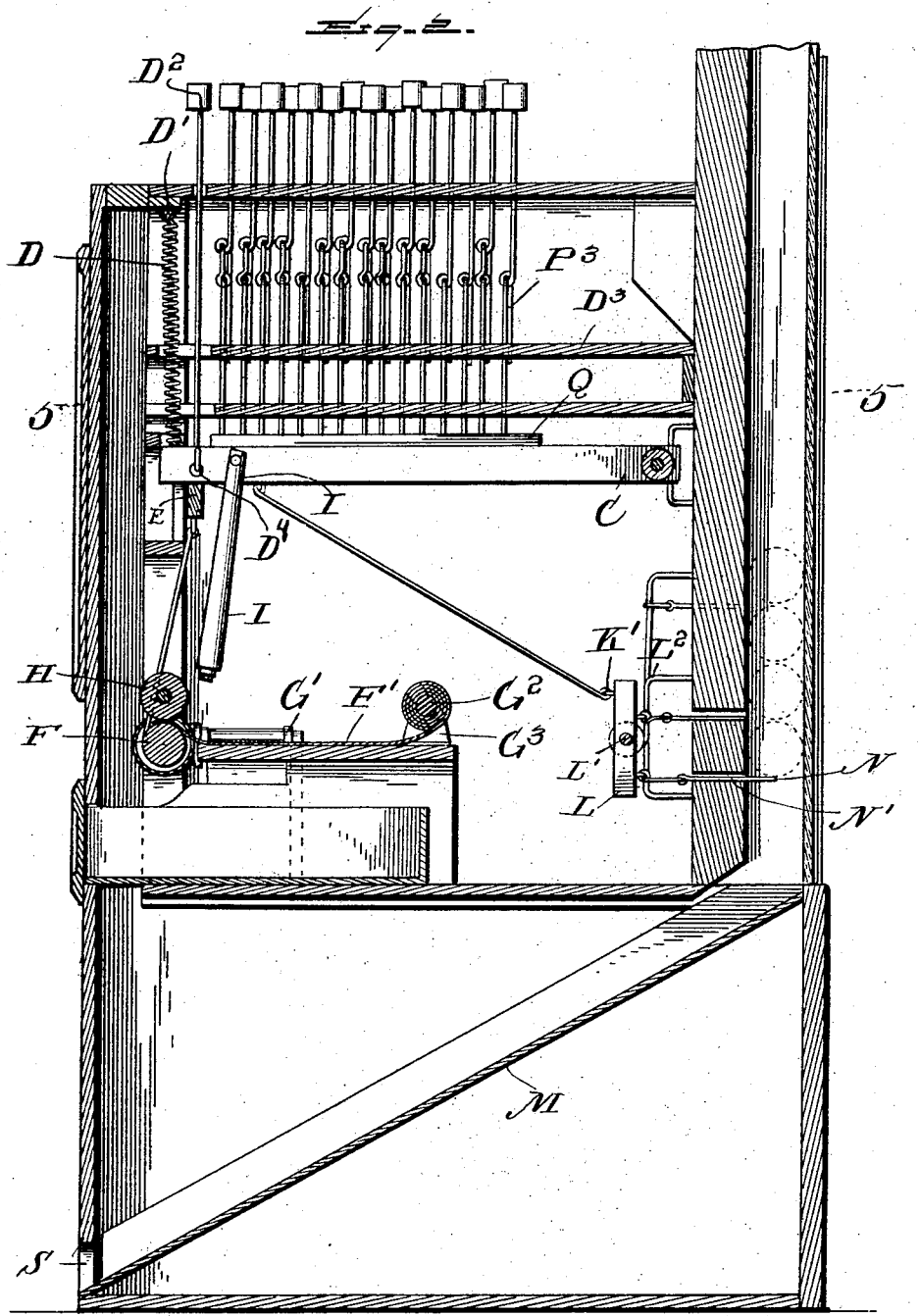

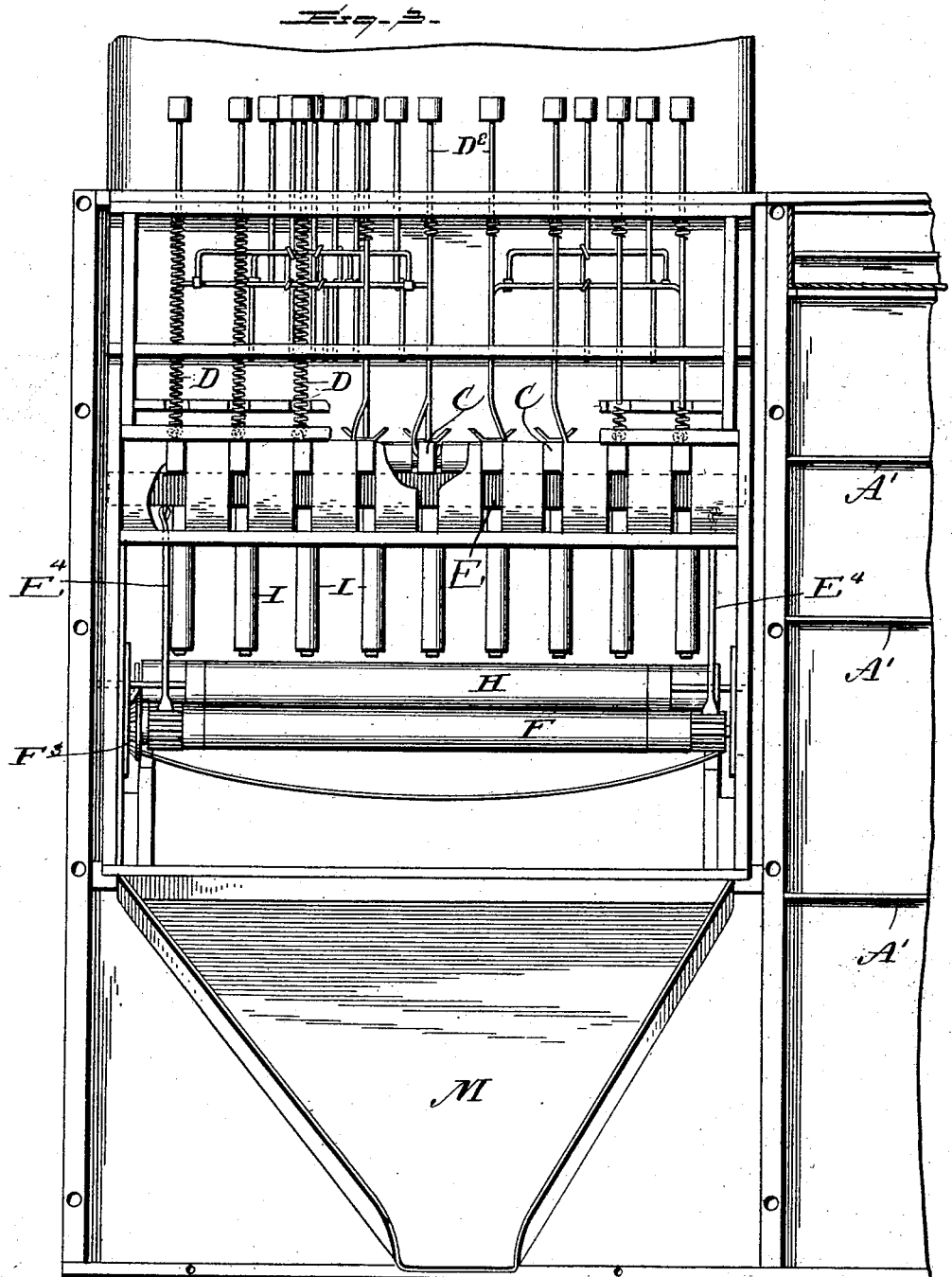

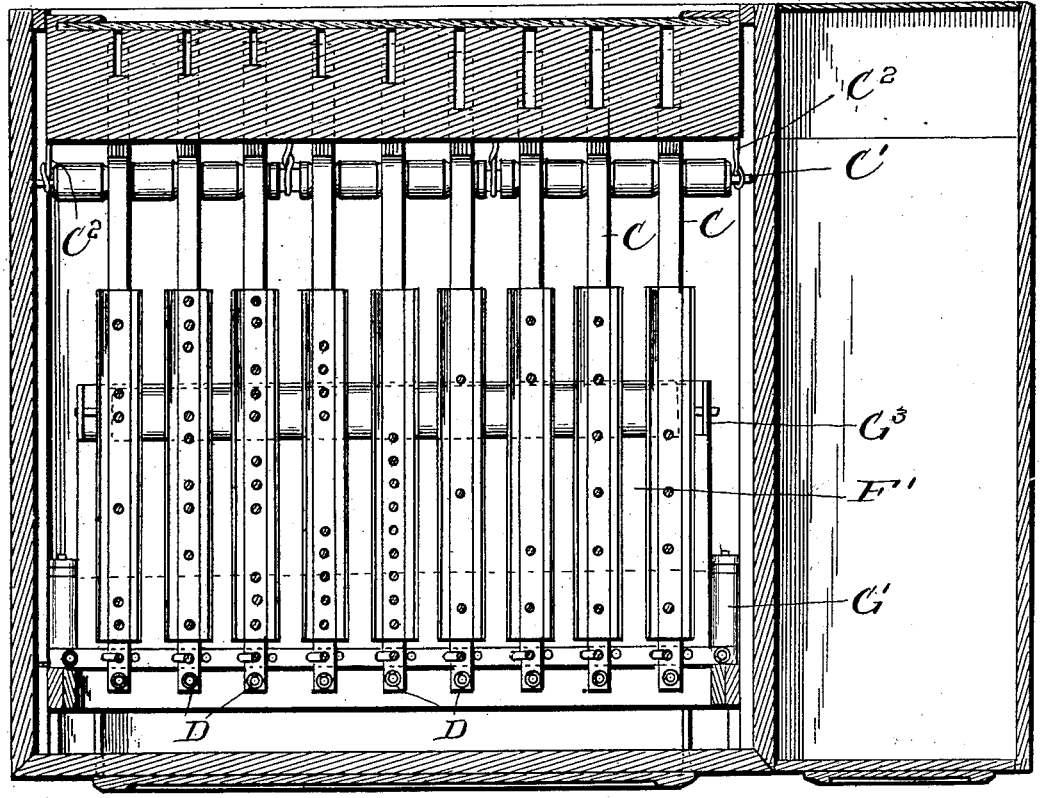
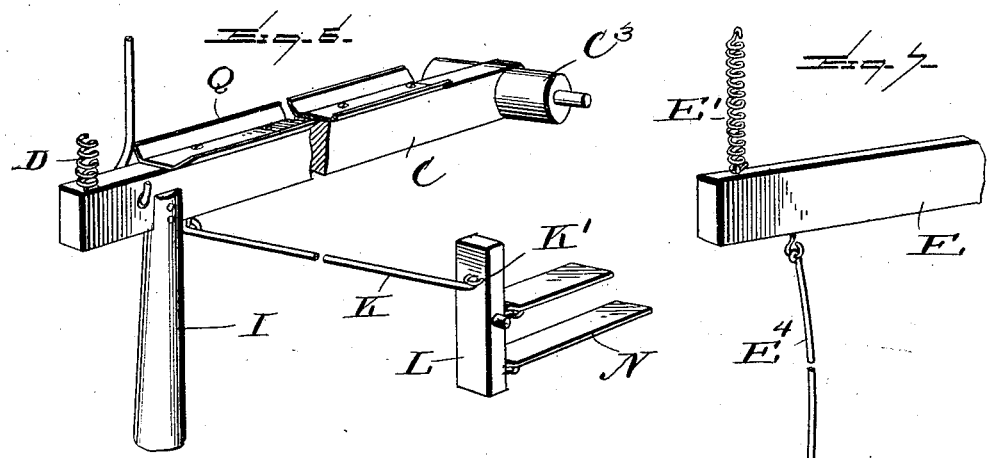

UNITED STATES PATENT OFFICE.

JAMES F. WOODSON AND OSCAR L. LINDSEY, OF ALBA, TEXAS, ASSIGNORS OF ONE-THIRD TO WALTER H. LOW, OF ALBA, TEXAS.

CASH-REGISTER.

SPECIFICATION forming part of Letters Patent No. 715,724, dated December 9, 1902.

Application filed June 17, 1902. Serial No. 112,092. (No model.)

*To all whom it may concern:*

Be it known that we, JAMES F. WOODSON and OSCAR L. LINDSEY, citizens of the United States, residing at Alba, in the county of Wood and State of Texas, have invented certain new and useful Improvements in Cash-Registers; and we do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in apparatus for making change and in the recording mechanism for printing the various amounts for which change is made; and it consists in various details of construction and combinations of parts, as will be hereinafter fully described, and then specifically defined in the appended claims.

The invention is clearly illustrated in the accompanying drawings, which, with the characters of reference marked thereon, form a part of this application, and in which drawings similar letters of reference indicate like parts in the several views, in which—

Figure 1 is a front elevation of the apparatus, showing the cabinet containing the operative mechanism. Fig. 2 is a central vertical section through the apparatus. Fig. 3 is an elevation of the mechanism with the front wall of the cabinet removed. Fig. 4 is a top plan view. Fig. 5 is a cross-sectional view taken on line 5 5 of Fig. 2. Fig. 6 is a perspective view of one of the tilting levers to which the printing-type is attached. Fig. 7 is a detail view of the means for rotating the roller on which the record-strip winds. Fig. 8 is a detail in perspective of one of the members to which a key is connected for depressing several levers. Fig. 9 is a similar view showing a key connected with two arms provided for the purpose of depressing the pivoted levers. Fig. 10 is a detail in perspective showing the means connected between the roll on which the ribbon winds and the reel about which the record-strip of paper is wound.

Reference now being had to the details of the drawings by letter, A designates a cabinet which may be made of any suitable shape and size, and for convenience at one side of the cabinet is arranged a cupboard with partitions A', forming pigeonholes or shelves, and a suitable door A² is hinged to one side of the receptacle and adapted to close the space containing said shelves, and immediately above the cupboard is a drawer A³, which may be used for the reception of money or for other purposes.

Referring to Figs. 2 and 4, it will be observed that in the rear part of the cabinet is a series of vertical slots, (designated by numerals 1 to 9, inclusive,) which slots are adapted to contain coin of different denominations. For instance, the four slots or chutes at the right of Fig. 4 are adapted to receive silver-dollar coins and the next slots to the left to receive in order coins of lower denominations, the coins contained within said slots or chutes being indicated by the row of keys designated by letters B and positioned adjacent to the edge of the top of the cabinet. Pivotally mounted within the cabinet is a series of levers C, an enlarged detail view of one being shown in Fig. 6 of the drawings, which levers are mounted upon a rod C', held in bracket-arms C², Fig. 5 of the drawings, and each of said levers is spaced apart by means of a washer C³. To the forward free end of each lever is fastened one end of a spring D, the upper end of each spring being connected at D' to the under surface of the top of the cabinet, as shown in Fig 2 of the drawings. These springs are provided for the purpose of holding said levers C normally in horizontal positions. In the drawings are shown nine of these levers, corresponding to the number of keys designated by letters B, and fastened to each key B is a rod D², which passes through apertures in the top of the cabinet and also in the horizontal partitions D³, and the lower end of each rod D² is connected, as at D⁴, Fig. 2, to a lever C. Positioned horizontally underneath the free ends of the levers C is a transverse cross-bar E, an enlarged detail view of an end thereof being shown in Fig. 7 of the drawings. Said bar is supported and held adjacent to or in contact with the under edges of the levers C by means of the springs E', which are secured at their lower ends to the lever E and at their upper ends to the cabinet. Mounted on a reel F is a strip of paper F', said reel being mounted upon a shaft F², which is journaled in the frame of the cabinet, and a bevel gear-wheel F³ is mounted to rotate with said reel F and is adapted to mesh with a bevel-gear G, which rotates with the spool G', on which an inking-ribbon is adapted to wind, said spool G' being suitably journaled on a shaft held at right angles to the reel F, the relative positions of said reel and spool being clearly shown in Fig. 10 of the drawings.

Immediately above the reel F is a contact-roller H, suitably journaled, and between which the strip of paper F' travels as it is wound upon the reel F. Said strip of paper unwinds from a roll G², mounted on bracket-arms G³, within the cabinet. Fastened to each lever C is an arm I, (shown clearly in Figs. 2 and 6 of the drawings,) which arm carries at its lower end a type bearing the numeral of the particular key which is connected to a rod fastened to said lever, whereby as each lever C is depressed the amount of coin which is allowed to be fed from one of said slots or chutes is printed upon the strip of paper. Fastened to each lever C is a rod K, the other end of which is fastened at K' to a tilting bar L, Figs. 2 and 6 of the drawings. Said bar L has pivotal pins L', centrally disposed, which are journaled in the brackets L², fastened to the inner wall of the cabinet. It will be noted that there are as many of these pivotal bars L as there are slots or chutes to contain the coins, one being provided for each key B and the corresponding slot in the rear of the cabinet. Pivoted to the outer face of each block L is a plurality of flat bars N, the upper one of said flat bars being provided for the purpose of holding up the coins above said bar, while the lower one is withdrawn from the slot or chute for the purpose of allowing the coins which are to be fed out to make change to make exit from the lower end of the slot into the chute M, disposed underneath the series of slots.

Mounted on the upper edge of each bar C is a flanged tray Q, a detail view of which is clearly shown in Fig. 6 of the drawings. These trays are provided for the purpose of guiding the lower ends of the fingers R, Fig. 8, of the lever-depressing members. It will be observed upon reference to Fig. 4 of the drawings that in the rear or behind the front row of keys B are disposed keys representing various amounts from fifteen cents to ten dollars. For instance, the key O (shown in Fig. 4 at the upper left-hand portion of the top of the cabinet) designates fifteen cents change, and this key is connected to a rod O', Fig. 9 of the drawings, to which are connected the two fingers O² and O³, one of said fingers O² being positioned directly over the pivoted lever C, which is directly underneath the second key bearing the numeral "5" in the front row, while the second finger O³ (illustrated in Fig. 9) is directly over the lever to which the key bearing the numeral "10" in the front row of keys is connected. It will therefore be noted that when it is desired to make fifteen cents change the operator by depressing the key O will cause the two fingers O² and O³ to come in contact with the pivoted levers to which the keys bearing the numerals "5" and "10" are connected, and on further downward pressure of the key O said two levers will be depressed, and the type carried by said lever C will cause the numerals "5" and "10" to be printed on the strip of paper, and the rods K, connecting the levers C with the two bars L, which are in alinement with the bars C, to tilt, and the upper of each pair of flat bars N will be pushed into the chutes containing the coins, (designated in Fig. 4 by numerals 2 and 3,) the former of which slots or chutes is adapted to contain nickels, while the latter contains ten-cent pieces. The pushing in of the upper of each of said flat bars N will hold the column of coins above while the lower bars N are withdrawn to allow a ten-cent piece to fall from one slot and a nickel from the other, the coins falling from their respective slots or chutes onto the inclined spout M and emerging at the outlet-aperture S, Figs. 1 and 2 of the drawings. Each of the other of said keys which are behind the front row in the top of the cabinet are similarly constructed to the one just described, with the exception of the number of fingers which are provided for the purpose of depressing a plurality of the levers C. For instance, in Fig. 8 of the drawings is shown a key P, connected by a rod P' to a bail P², which supports five fingers, (designated by letters P³,) which in the present instance is the largest number of fingers employed in the mechanism which we have illustrated and which fingers are utilized in making change for ninety-five cents, and when it is desired to make ninety-five cents change the operator presses the key P, which will cause the levers to which the keys bearing numerals "50," "25," "10," "5," and "5" to be depressed, which will throw five pairs of flat slides N into the respective slots, allowing a fifty-cent piece, a twenty-five-cent piece, a dime, and two nickels to fall from their respective slots down the inclined spout to the exit-aperture S and at the same time causing the printing of ninety-five cents upon the record-strip. As each of the members carrying the fingers is depressed a guide-pin P⁶ enters an aperture in a transverse partition in the register and serves as a guide as the fingers are reciprocated. As the bar E is depressed the feeding-pawls E⁴, the forward ends of which engage the ratchet-teeth carried by the reels, will cause a partial rotary movement to be applied to the reel about which the record-strip winds for the purpose of feeding the strip forward after the amount of change to be made has been printed.

When it is desired to cause, for instance, four dollars to be fed out of the slot containing the dollar coins, the flat slides N may be of such a distance apart as to allow but four dollars to pass when the upper of said slides is pushed in and the lower one withdrawn from the path of the dollars in the slot, and in the slot 8, which is the second from the right in Fig. 4, the bars N are so positioned with relation to each other that three dollar coins are allowed to fall at once, and in slot 17 the bars N are such a distance apart as to allow two dollar coins, and in slot 16 the bars are in such positions with relation to each other as to allow but a single coin to be deposited, as shown in Fig. 2 of the drawings. When it is desired to make change for ten dollars, the operator by depressing upon the key T, to which is connected a wire having four depressing-fingers similar to those shown in Fig. 8, the levers C, to which the numerals representing one dollar, two dollars, three dollars, and four dollars are connected, are depressed, which will allow four dollars to make exit from the slot 9, three dollars from the next slot, two from the next, and one from slot 16. The other keys are connected and operated in a similar manner according to the amount of change it is desired to make by the depression of any one of the several keys.

By the provision of an apparatus embodying our invention, which, if desired, may be varied in details without departing from the spirit of our invention, change of any amount from five cents to ten dollars may be readily made and the record of the amount printed by merely depressing the proper keys in the manner shown and described.

Having thus fully described our invention, what we claim as new, and desire to secure by Letters Patent, is—

1. An apparatus for making change and recording the same comprising a cabinet having a series of slots adapted to receive coins of different denominations, independent parallel pivoted levers to which are connected reciprocating bars adapted to traverse said slots and allow a certain number of coins to be deposited from the slots, keys, and means carried by the keys for engaging and tilting a plurality of said levers as one of said keys is depressed, as set forth.

2. A change-making apparatus comprising a cabinet having a series of coin-containing slots, a series of pivoted levers, reciprocating bars adapted to allow one or more of said coins to be deposited from the slots, connections between said levers and bars, keys, a plurality of fingers adapted to be actuated by any one of said keys, whereby a plurality of levers are actuated to cause coins to fall from a plurality of said slots, and recording mechanism actuated by said levers, as set forth.

3. An apparatus for making change comprising a cabinet having a series of slots for the reception of coins of different denominations, a series of pivoted levers, reciprocating bars connected to each of said levers and adapted to reciprocate simultaneously in opposite directions for the purpose of holding a column of coins and allowing a predetermined number of same to make exit from a slot, keys, a plurality of fingers actuated by said keys for the purpose of depressing a plurality of said levers, a type carried by each lever, a record-strip, and means for returning said levers to their normal positions, as set forth.

4. An apparatus for making change comprising a cabinet having a series of slots for the reception of coins of different denominations, reciprocating bars adapted to be actuated in opposite directions simultaneously for the purpose of holding a column of coins and allowing a certain number to be discharged, a series of pivoted levers, connections between same and said bars, keys, a plurality of fingers to depress a plurality of said levers, a type carried by each lever, a record-strip and reel, and means for winding up said strip as change is made by the depression of one of said levers, as set forth.

5. An apparatus for making change comprising a cabinet having a series of vertically-disposed coin-containing slots, pivoted bars mounted in the cabinet, reciprocating slides or bars having pivotal connection therewith and adapted to be simultaneously operated in opposite directions for the purpose of holding a column of coins and allowing a predetermined number to make exit from a slot, a series of pivoted levers, rod connections between same and said pivoted bars, keys, a plurality of fingers connected therewith and adapted to depress a plurality of said levers, and a record mechanism for printing the amount of change being made, as set forth.

6. An apparatus for making change comprising a cabinet having a series of vertically-disposed coin-containing slots, pivoted bars, reciprocating slides connected thereto and adapted to be operated simultaneously in opposite directions, whereby the column of coins is supported while a certain number are allowed to make exit from the slots, a series of pivoted levers, keys, and fingers actuated by said keys which are adapted to depress a plurality of pivoted levers, a recording mechanism, feeding-pawls which are actuated by said levers for the purpose of winding up the record-strip, and printing members carried by the levers, as set forth.

7. An apparatus for making change and recording the same comprising in combination with a cabinet having a series of vertically-disposed slots for the reception of coins of different denominations, horizontally-disposed slides adapted to be operated simultaneously in opposite directions for allowing a predetermined number of coins to be discharged from the slots, a series of spring-actuated levers having connection with said slides, an arm connected to each lever, a type at the end of said arm, a record-strip underneath said arm, means for feeding the same forward, a series of keys, and fingers connected thereto and adapted to depress a plurality of said levers, whereby various amounts of change may be made and the amount recorded, as set forth.

8. An apparatus for making change comprising a cabinet having a series of coin-containing slots, reciprocating slides adapted to be actuated simultaneously in opposite directions, and guided in apertures or slots in the wall of the cabinet, rocking blocks mounted within the cabinet and having pivotal connections with said slides, a series of spring-actuated, pivoted levers mounted within the cabinet, rods pivotally connecting said levers with the rocking bars, an arm connected to each of said levers near its free end and having a printing-type thereon, and a printing-strip mounted on a suitable reel, a spring-actuated bar disposed underneath said levers, feeding-pawls pivoted to said spring-actuated bar and adapted at each depression of any one of said levers to cause the record-strip to be fed forward, a series of keys, fingers actuated by said keys and adapted to depress a plurality of said levers, as set forth.

9. An apparatus for making change comprising a cabinet having a series of slots for the reception of coins of different denominations, reciprocating slides adapted to be reciprocated simultaneously in opposite directions for the purpose of allowing a predetermined number of coins to be deposited from said slots, a series of spring-actuated levers mounted in the cabinet, connections between the same and said slides, depressible keys, flanged trays carried by the upper face of said levers, fingers actuated by said keys and adapted to depress a plurality of said levers, and printing mechanism for recording the change being made, as set forth.

10. An apparatus for making change comprising a cabinet having a series of vertically-disposed slots for the reception of coins of different denominations, reciprocating slides for allowing a certain number of coins to make exit from the slots, bracket-arms mounted within the cabinet, a shaft carried by said arms, spring-actuated levers pivoted on said shaft, a series of keys, fingers, adapted to depress said levers, a rod connecting each of said keys with a series of fingers, guides for said fingers, means for automatically printing the amount of change being made, as a key is depressed, and connections between said levers and slides, as set forth.

11. An apparatus for making change and recording the same comprising a cabinet having slots for the reception of coins of different denominations, and horizontally-movable slides for allowing a predetermined number of coins to make exit from the slots, a series of pivotal spring-actuated bars, a metallic plate upon the upper face of said levers having its longitudinal edges flanged, secured to the upper face of each of said levers, a series of keys, a plurality of fingers connected to each key and positioned above said levers, an arm connected to each lever, and a type at the end of said arm, a record-strip, and means for feeding the same forward as one of said keys is depressed, as set forth.

12. An apparatus for making change and recording the same comprising in combination with the cabinet having a series of slots adapted for the reception of coins of different denominations, reciprocating guides for allowing a predetermined number of coins to make exit from the slots, a series of pivoted levers, flanged metallic plates upon the upper face of said levers, one secured to each of said levers, a series of keys, a bail-shaped member having fingers, a rod connecting said member with a key, each of said fingers designed to be positioned over a distinct lever, whereby as the key is depressed a plurality of levers will be actuated to cause the coins to be fed from said slots and recording mechanism actuated as the change is made, as set forth.

13. An apparatus for making change and recording the same comprising a cabinet having a series of elongated slots for the reception of coins of different denominations, slides which are actuated simultaneously in opposite directions for allowing a predetermined number of coins to make exit from the slots, pivoted and spring-actuated levers, connections between the same and said slides, rods $D^2$ connected to said levers and carrying keys at their upper ends, printing mechanism actuated by the levers, a series of keys, and fingers connected thereto and adapted to bear against a plurality of said levers, as set forth.

14. An apparatus for making change and recording the same comprising a cabinet having a series of vertically-disposed slots for the reception of coins of different denominations, an inclined chute M into which the coins are designed to fall, reciprocating slides actuated simultaneously in opposite directions for allowing a predetermined number of coins to make exit from the slots, a series of pivoted spring-actuated levers, metallic plates with flanged edges mounted on the upper face of said levers, a series of keys, fingers connected with said keys and adapted to depress a plurality of said levers as one of said keys is actuated, and printing mechanism adapted to record the amount of change being made, as set forth.

15. An apparatus for making change and recording the same, comprising in combination with the cabinet having a series of vertically-disposed slots for the reception of coins of different denominations, slides for discharging a certain number of coins at one time from one or another of said slots, a series of spring-actuated pivoted levers, connections between said levers and slides, bail-shaped members having fingers which are adapted to contact with said levers to depress the same, series of rods connected to said bail-shaped members, and keys mounted on said rods, and apertured partitions through which the lower ends of said fingers are guided, as the keys are depressed, as set forth.

In testimony whereof we affix our signatures in presence of two witnesses.

JAMES F. WOODSON.
OSCAR L. LINDSEY.

Witnesses:
R. A. CAIN,
A. L. CAIN.